United States Patent
Wall et al.

(10) Patent No.: US 8,046,806 B2
(45) Date of Patent: Oct. 25, 2011

(54) MULTIROOM POINT OF DEPLOYMENT MODULE

(76) Inventors: William E. Wall, Atlanta, GA (US); Samuel H. Russ, Lawrenceville, GA (US)

( * ) Notice: Subject to any disclaimer, the term of this patent is extended or adjusted under 35 U.S.C. 154(b) by 0 days.

(21) Appl. No.: 11/162,232

(22) Filed: Sep. 2, 2005

(65) Prior Publication Data

US 2006/0010481 A1     Jan. 12, 2006

Related U.S. Application Data (63) Continuation-in-part of application No. 10/342,670, filed on Jan. 15, 2003.

(60) Provisional application No. 60/416,155, filed on Oct. 4, 2002, provisional application No. 60/424,269, filed on Nov. 6, 2002.

(51) Int. Cl.
    *H04N 7/18*     (2006.01)

(52) U.S. Cl. ............... 725/78; 725/80; 725/82; 348/552

(58) Field of Classification Search .............. 725/78–85, 725/111, 131–134, 139–142, 151–153; 348/552, 348/553, 563
See application file for complete search history.

(56) References Cited

U.S. PATENT DOCUMENTS

| | | | |
|---|---|---|---|
| 4,215,366 A | 7/1980 | Davidson | |
| 4,290,081 A | 9/1981 | Foerster | |
| 4,439,784 A | 3/1984 | Furukawa et al. | |
| 4,535,355 A | 8/1985 | Arn et al. | |
| 4,540,958 A | 9/1985 | Neyens et al. | |
| 4,578,533 A | 3/1986 | Pierce | |
| 4,644,526 A | 2/1987 | Wu | |
| 4,686,564 A | 8/1987 | Masuko et al. | |
| 4,706,121 A | 11/1987 | Young | |
| 4,751,578 A | 6/1988 | Reiter et al. | |
| 4,885,803 A | 12/1989 | Hermann et al. | |
| 4,907,079 A | 3/1990 | Turner et al. | |
| 4,908,713 A | 3/1990 | Levine | |
| 4,916,532 A | 4/1990 | Streck et al. | |
| 4,963,994 A | 10/1990 | Levine | |
| 4,963,995 A | 10/1990 | Lang | |
| 5,010,299 A | 4/1991 | Nishizawa et al. | |

(Continued)

FOREIGN PATENT DOCUMENTS

CA     2501107     1/2011

(Continued)

OTHER PUBLICATIONS

Kerr, G., "A Review of Fully Interactive Video on Demand" Signal Processing Image Communication, Elsevier Science Publishers, Amsterdam, NL, vol. 8, No. 3, Apr. 1996, pp. 173-190, XP004047063 ISSN: 09235965.

(Continued)

*Primary Examiner* — Annan Q Shang
(74) *Attorney, Agent, or Firm* — Merchant & Gould (57) ABSTRACT

Systems and methods are disclosed for providing downstream signals to a plurality of receiver networks. A receiver network (i.e., a networked multimedia system) includes a splitter/isolation module (SIM), a primary set-top terminal (STT), and at least one point of deployment module. The point of deployment module communicates with the primary STT via the SIM over coaxial cable. Accordingly, the point of deployment module and connected television utilize some or all of the features including hardware and software that are included in the primary STT via the networked multimedia system.

18 Claims, 5 Drawing Sheets

U.S. PATENT DOCUMENTS

| | | | |
|---|---|---|---|
| 5,010,399 A | 4/1991 | Goodman et al. | |
| 5,038,211 A | 8/1991 | Hallenbeck | |
| 5,048,054 A | 9/1991 | Eyuboglu et al. | |
| 5,155,591 A | 10/1992 | Wachob | |
| 5,168,372 A | 12/1992 | Sweetser | |
| 5,251,074 A | 10/1993 | Hamma et al. | |
| 5,253,066 A | 10/1993 | Vogel | |
| 5,293,357 A | 3/1994 | Hallenbeck | |
| 5,294,981 A | 3/1994 | Yazolino et al. | |
| 5,381,449 A | 1/1995 | Jasper et al. | |
| 5,406,626 A | 4/1995 | Ryan | |
| 5,412,416 A | 5/1995 | Nemirofsky | |
| 5,479,268 A | 12/1995 | Young et al. | |
| 5,481,542 A | 1/1996 | Logston et al. | |
| 5,508,815 A | 4/1996 | Levine | |
| 5,515,377 A | 5/1996 | Horne et al. | |
| 5,524,051 A | 6/1996 | Ryan | |
| 5,553,211 A | 9/1996 | Uotani | |
| 5,568,272 A | 10/1996 | Levine | |
| 5,574,964 A | 11/1996 | Hamlin | |
| 5,579,308 A | 11/1996 | Humpleman | |
| 5,590,195 A | 12/1996 | Ryan | |
| 5,600,364 A | 2/1997 | Hendricks et al. | |
| 5,600,573 A | 2/1997 | Hendricks et al. | |
| 5,600,707 A | 2/1997 | Miller, II | |
| 5,621,793 A | 4/1997 | Bednarek et al. | |
| 5,636,247 A | 6/1997 | Kamerman et al. | |
| 5,638,423 A | 6/1997 | Grube et al. | |
| 5,642,384 A | 6/1997 | Ramesh | |
| 5,652,772 A | 7/1997 | Isaksson et al. | |
| 5,657,072 A | 8/1997 | Aristides et al. | |
| 5,666,151 A | 9/1997 | Kondo et al. | |
| 5,682,206 A | 10/1997 | Wehmeyer et al. | |
| 5,699,105 A | 12/1997 | Chen et al. | |
| 5,701,383 A | 12/1997 | Russo et al. | |
| 5,708,961 A | 1/1998 | Hylton et al. | |
| 5,714,945 A | 2/1998 | Sakuma et al. | |
| 5,715,020 A | 2/1998 | Kuroiwa et al. | |
| 5,715,277 A | 2/1998 | Goodson et al. | |
| 5,732,359 A | 3/1998 | Baranowsky et al. | |
| 5,734,437 A | 3/1998 | Back | |
| 5,751,806 A | 5/1998 | Ryan | |
| 5,758,257 A | 5/1998 | Herz et al. | |
| 5,760,822 A | 6/1998 | Coutinho | |
| 5,774,527 A | 6/1998 | Handelman et al. | |
| 5,778,181 A | 7/1998 | Hidary et al. | |
| 5,787,472 A | 7/1998 | Dan et al. | |
| 5,793,413 A | 8/1998 | Hylton et al. | |
| 5,796,442 A | 8/1998 | Gove et al. | |
| 5,801,787 A | 9/1998 | Schein et al. | |
| 5,805,763 A | 9/1998 | Lawler et al. | |
| 5,808,659 A | 9/1998 | Coutinho et al. | |
| 5,809,204 A | 9/1998 | Young et al. | |
| 5,815,794 A | 9/1998 | Williams | |
| 5,828,403 A | 10/1998 | DeRodeff et al. | |
| 5,835,128 A | 11/1998 | MacDonald et al. | |
| 5,835,602 A | 11/1998 | Lang | |
| 5,838,873 A * | 11/1998 | Blatter et al. | 386/95 |
| 5,850,218 A | 12/1998 | LaJoie et al. | |
| 5,850,340 A | 12/1998 | York | |
| 5,851,149 A | 12/1998 | Xidos et al. | |
| 5,867,485 A | 2/1999 | Chambers et al. | |
| 5,872,644 A | 2/1999 | Yamazaki et al. | |
| 5,883,677 A | 3/1999 | Hofmann | 348/584 |
| 5,886,732 A | 3/1999 | Humpleman | |
| 5,886,753 A | 3/1999 | Shinyagaito et al. | |
| 5,915,068 A | 6/1999 | Levine | |
| 5,920,801 A | 7/1999 | Thomas et al. | |
| 5,930,247 A | 7/1999 | Miller, II et al. | |
| 5,936,660 A | 8/1999 | Gurantz | |
| 5,940,073 A | 8/1999 | Klosterman et al. | |
| 5,940,387 A | 8/1999 | Humpleman | |
| 5,970,053 A | 10/1999 | Schick et al. | |
| 5,970,386 A | 10/1999 | Williams | |
| 5,983,068 A | 11/1999 | Tomich et al. | |
| 5,990,927 A | 11/1999 | Hendricks et al. | |
| 5,995,258 A | 11/1999 | Weber et al. | |
| 5,999,622 A | 12/1999 | Yasukawa et al. | 705/51 |
| 6,005,861 A | 12/1999 | Humpleman | |
| 6,005,876 A | 12/1999 | Cimini, Jr. et al. | |
| 6,006,257 A | 12/1999 | Slezak | |
| 6,014,546 A | 1/2000 | Georges et al. | |
| 6,018,768 A | 1/2000 | Ullman et al. | |
| 6,023,603 A | 2/2000 | Matsubara | 455/3.2 |
| 6,026,150 A | 2/2000 | Frank | |
| 6,037,998 A | 3/2000 | Usui et al. | |
| 6,052,556 A | 4/2000 | Sampsell | |
| 6,055,355 A | 4/2000 | Lee | |
| 6,061,449 A | 5/2000 | Candelore et al. | |
| 6,069,621 A | 5/2000 | Schupak | 715/717 |
| 6,073,122 A | 6/2000 | Wool | |
| 6,091,320 A | 7/2000 | Odinak | |
| 6,091,767 A | 7/2000 | Westerman | |
| 6,100,883 A | 8/2000 | Hoarty | |
| 6,100,936 A | 8/2000 | Jordan et al. | |
| 6,115,456 A | 9/2000 | Nolde | |
| 6,118,873 A | 9/2000 | Lotspiech et al. | |
| 6,119,154 A | 9/2000 | Weaver et al. | |
| 6,122,482 A | 9/2000 | Green, Sr. et al. | 455/3.2 |
| 6,125,103 A | 9/2000 | Bauml et al. | |
| 6,133,912 A | 10/2000 | Montero | |
| 6,151,493 A | 11/2000 | Sasakura et al. | |
| 6,166,744 A | 12/2000 | Jaszlics et al. | |
| 6,169,543 B1 | 1/2001 | Wehmeyer | |
| 6,172,712 B1 | 1/2001 | Beard | |
| 6,175,343 B1 | 1/2001 | Mitchell et al. | |
| 6,175,551 B1 | 1/2001 | Awater et al. | |
| 6,177,931 B1 | 1/2001 | Alexander et al. | |
| 6,177,963 B1 | 1/2001 | Foye et al. | |
| 6,181,784 B1 | 1/2001 | Duran et al. | |
| 6,182,287 B1 | 1/2001 | Schneidewend et al. | |
| 6,188,700 B1 | 2/2001 | Kato et al. | |
| 6,202,211 B1 | 3/2001 | Williams, Jr. | |
| 6,208,669 B1 | 3/2001 | Cimini, Jr. et al. | |
| 6,215,526 B1 | 4/2001 | Barton et al. | |
| 6,219,839 B1 | 4/2001 | Sampsell | |
| 6,229,895 B1 | 5/2001 | Son et al. | |
| 6,230,162 B1 | 5/2001 | Kumar et al. | |
| 6,233,389 B1 | 5/2001 | Barton et al. | |
| 6,236,653 B1 | 5/2001 | Dalton et al. | |
| 6,240,555 B1 | 5/2001 | Daniel et al. | |
| 6,243,142 B1 | 6/2001 | Mugura et al. | |
| 6,263,503 B1 | 7/2001 | Margulis | |
| 6,285,746 B1 | 9/2001 | Duran et al. | |
| 6,286,140 B1 | 9/2001 | Ivanyi | |
| 6,286,142 B1 | 9/2001 | Ehreth | |
| 6,305,017 B1 | 10/2001 | Satterfield | |
| 6,310,886 B1 | 10/2001 | Barton | |
| 6,314,146 B1 | 11/2001 | Tellado et al. | |
| 6,317,884 B1 | 11/2001 | Eames et al. | |
| 6,324,338 B1 | 11/2001 | Wood et al. | |
| 6,327,418 B1 | 12/2001 | Barton | |
| 6,330,334 B1 | 12/2001 | Ryan | |
| 6,333,937 B1 | 12/2001 | Ryan | |
| 6,353,929 B1 | 3/2002 | Houston | |
| 6,356,309 B1 | 3/2002 | Masaki et al. | |
| 6,377,552 B1 | 4/2002 | Moran et al. | |
| 6,377,782 B1 | 4/2002 | Bishop et al. | |
| 6,378,130 B1 | 4/2002 | Adams | |
| 6,411,820 B1 | 6/2002 | Margarit et al. | |
| 6,415,031 B1 | 7/2002 | Colligan et al. | |
| 6,418,558 B1 | 7/2002 | Roberts et al. | |
| 6,421,706 B1 | 7/2002 | McNeill et al. | |
| 6,424,947 B1 * | 7/2002 | Tsuria et al. | 705/1 |
| 6,438,165 B2 | 8/2002 | Normile | |
| 6,441,832 B1 | 8/2002 | Tao et al. | |
| 6,442,755 B1 | 8/2002 | Lemmons et al. | |
| 6,452,923 B1 * | 9/2002 | Gerszberg et al. | 370/352 |
| 6,459,427 B1 | 10/2002 | Mao et al. | |
| 6,473,559 B1 | 10/2002 | Knudson et al. | |
| 6,481,013 B1 | 11/2002 | Dinwiddie et al. | |
| 6,483,548 B1 | 11/2002 | Allport | |
| 6,493,875 B1 | 12/2002 | Eames et al. | |
| 6,496,980 B1 | 12/2002 | Tillman et al. | |
| 6,505,348 B1 | 1/2003 | Knowles et al. | |
| 6,516,029 B1 | 2/2003 | Wang | |
| 6,526,581 B1 * | 2/2003 | Edson | 725/74 |

| | | |
|---|---|---|
| 6,530,085 B1 | 3/2003 | Perlman |
| 6,535,717 B1 | 3/2003 | Matsushima et al. |
| 6,536,041 B1 | 3/2003 | Knudson et al. |
| 6,542,610 B2 | 4/2003 | Traw et al. |
| 6,556,557 B1 | 4/2003 | Cimini, Jr. et al. |
| 6,567,981 B1 | 5/2003 | Jeffrey |
| 6,578,070 B1 | 6/2003 | Weaver et al. |
| 6,588,017 B1 | 7/2003 | Calderone |
| 6,594,798 B1 | 7/2003 | Chou et al. |
| 6,614,936 B1 | 9/2003 | Wu et al. |
| 6,622,304 B1 | 9/2003 | Carhart |
| 6,622,307 B1 | 9/2003 | Ho |
| 6,631,522 B1 | 10/2003 | Erdelyi |
| 6,637,031 B1 | 10/2003 | Chou |
| 6,675,385 B1 | 1/2004 | Wang |
| 6,681,326 B2 | 1/2004 | Son et al. |
| 6,697,426 B1 | 2/2004 | Van Der Schaar et al. |
| 6,697,489 B1 * | 2/2004 | Candelore ................ 380/200 |
| 6,704,028 B2 | 3/2004 | Wugofski |
| 6,711,132 B2 | 3/2004 | Lazarus |
| 6,735,221 B1 | 5/2004 | Cherubini |
| 6,735,312 B1 | 5/2004 | Abdalla et al. |
| 6,754,905 B2 | 6/2004 | Gordon et al. |
| 6,756,997 B1 | 6/2004 | Ward et al. |
| 6,757,906 B1 | 6/2004 | Look et al. |
| 6,766,526 B1 | 7/2004 | Ellis |
| 6,769,127 B1 | 7/2004 | Bonomi et al. |
| 6,771,908 B2 | 8/2004 | Eijk et al. |
| 6,785,258 B1 | 8/2004 | Garcia, Jr. et al. |
| 6,785,901 B1 | 8/2004 | Horiwitz et al. ................ 725/25 |
| 6,788,740 B1 | 9/2004 | van der Schaar et al. |
| 6,789,106 B2 * | 9/2004 | Eyer et al. ................ 709/205 |
| 6,791,995 B1 | 9/2004 | Azenkot et al. |
| 6,795,205 B1 | 9/2004 | Gacek |
| 6,798,838 B1 | 9/2004 | Ngo |
| 6,804,357 B1 | 10/2004 | Ikonen et al. |
| 6,816,194 B2 | 11/2004 | Zhang et al. |
| 6,816,904 B1 | 11/2004 | Ludwig et al. |
| 6,845,486 B2 | 1/2005 | Yamada et al. |
| 6,864,778 B2 | 3/2005 | Musschebroeck et al. |
| 6,868,292 B2 | 3/2005 | Ficco et al. |
| 6,870,570 B1 | 3/2005 | Bowser |
| 6,889,385 B1 * | 5/2005 | Rakib et al. ................ 725/119 |
| 6,904,522 B1 | 6/2005 | Benardeau et al. |
| 6,915,529 B1 | 7/2005 | Suematsu et al. |
| 6,922,843 B1 | 7/2005 | Herrington et al. |
| 6,930,788 B1 | 8/2005 | Iwamoto et al. |
| 6,941,515 B1 | 9/2005 | Wilkins |
| 6,950,517 B2 | 9/2005 | Hawkes et al. ................ 725/87 |
| 6,950,623 B2 | 9/2005 | Brown et al. |
| 6,954,897 B1 | 10/2005 | Noguchi et al. |
| 6,957,344 B1 | 10/2005 | Goldshlag et al. |
| 6,970,539 B2 * | 11/2005 | Yamamoto et al. ...... 379/102.05 |
| 6,978,474 B1 | 12/2005 | Sheppard et al. ................ 725/83 |
| 6,996,623 B1 | 2/2006 | Kawano et al. |
| 6,996,837 B1 | 2/2006 | Miura et al. |
| 7,020,890 B1 | 3/2006 | Suematsu et al. |
| 7,020,892 B2 | 3/2006 | Levesque et al. |
| 7,039,169 B2 | 5/2006 | Jones |
| 7,039,245 B1 | 5/2006 | Hamery |
| 7,042,526 B1 | 5/2006 | Borseth |
| 7,047,305 B1 | 5/2006 | Brooks et al. |
| 7,054,289 B1 | 5/2006 | Foster et al. |
| 7,065,781 B1 | 6/2006 | Entwistle ................ 725/135 |
| 7,072,945 B1 * | 7/2006 | Nieminen et al. ............ 709/217 |
| 7,093,295 B1 | 8/2006 | Saito |
| 7,114,174 B1 | 9/2006 | Brooks et al. |
| 7,116,894 B1 | 10/2006 | Chatterton |
| 7,127,734 B1 * | 10/2006 | Amit ................ 725/80 |
| 7,130,576 B1 | 10/2006 | Gurantz et al. ............ 455/3.02 |
| 7,139,398 B2 | 11/2006 | Candelore et al. |
| 7,140,033 B1 | 11/2006 | Durden et al. |
| 7,143,296 B2 * | 11/2006 | Hirata ................ 713/189 |
| 7,146,628 B1 | 12/2006 | Gordon et al. |
| 7,155,012 B2 | 12/2006 | Candelore et al. |
| 7,184,550 B2 | 2/2007 | Graunke |
| 7,185,095 B2 * | 2/2007 | Kawamoto et al. ............ 709/225 |
| 7,185,355 B1 | 2/2007 | Ellis et al. ................ 725/46 |
| 7,190,901 B2 | 3/2007 | Farmer et al. |
| 7,194,558 B2 * | 3/2007 | Kawamoto et al. ............ 709/249 |
| 7,209,667 B2 | 4/2007 | Lindblad |
| 7,218,738 B2 | 5/2007 | Pedlow et al. ................ 380/218 |
| 7,222,358 B2 | 5/2007 | Levinson et al. |
| 7,233,669 B2 | 6/2007 | Candelore |
| 7,234,155 B1 | 6/2007 | Kay et al. |
| 7,260,829 B1 | 8/2007 | Hendricks et al. |
| 7,278,154 B2 | 10/2007 | Harrison et al. |
| 7,310,355 B1 | 12/2007 | Krein et al. |
| 7,313,811 B1 | 12/2007 | Sheppard et al. |
| 7,336,787 B2 | 2/2008 | Unger et al. ................ 380/217 |
| 7,346,120 B2 | 3/2008 | McCorkle |
| 7,346,134 B2 | 3/2008 | Smith ................ 375/346 |
| 7,350,225 B2 | 3/2008 | Ovadia |
| 7,360,233 B2 | 4/2008 | Russ et al. |
| 7,360,235 B2 | 4/2008 | Davies et al. |
| 7,366,914 B2 | 4/2008 | Graunke ................ 713/190 |
| 7,392,389 B2 | 6/2008 | Kori ................ 713/170 |
| 7,434,246 B2 | 10/2008 | Florence |
| 7,487,532 B2 | 2/2009 | Robertson et al. ............ 725/111 |
| 7,489,924 B2 | 2/2009 | Choi |
| 7,516,470 B2 | 4/2009 | Russ et al. ................ 725/48 |
| 7,545,935 B2 | 6/2009 | Claussen ................ 380/200 |
| 7,574,723 B2 | 8/2009 | Putterman et al. |
| 7,603,684 B1 | 10/2009 | Ellis ................ 725/39 |
| 7,673,314 B2 | 3/2010 | Ellis et al. ................ 725/46 |
| 7,849,486 B2 | 12/2010 | Russ et al. |
| 7,861,272 B2 | 12/2010 | Russ et al. |
| 7,870,584 B2 | 1/2011 | Russ et al. |
| 7,876,998 B2 | 1/2011 | Wall et al. |
| 7,908,625 B2 | 3/2011 | Robertson et al. |
| 2001/0005906 A1 | 6/2001 | Humpleman |
| 2001/0011373 A1 | 8/2001 | Inoue ................ 725/50 |
| 2001/0017920 A1 | 8/2001 | Son et al. |
| 2001/0030664 A1 | 10/2001 | Shulman et al. |
| 2001/0039660 A1 | 11/2001 | Vasilevsky et al. |
| 2002/0002707 A1 | 1/2002 | Ekel et al. |
| 2002/0007485 A1 | 1/2002 | Rodriguez et al. |
| 2002/0007493 A1 | 1/2002 | Butler et al. |
| 2002/0010936 A1 | 1/2002 | Adam |
| 2002/0019984 A1 | 2/2002 | Rakib |
| 2002/0035726 A1 | 3/2002 | Corl |
| 2002/0035729 A1 | 3/2002 | Diep |
| 2002/0040475 A1 | 4/2002 | Yap et al. |
| 2002/0044762 A1 | 4/2002 | Wood et al. |
| 2002/0051200 A1 | 5/2002 | Chang et al. ................ 358/1.15 |
| 2002/0051581 A1 | 5/2002 | Takeuchi et al. |
| 2002/0056112 A1 | 5/2002 | Dureau et al. |
| 2002/0059584 A1 | 5/2002 | Ferman et al. |
| 2002/0059615 A1 | 5/2002 | Okawara et al. |
| 2002/0059617 A1 | 5/2002 | Terakado et al. |
| 2002/0059623 A1 | 5/2002 | Rodriguez et al. |
| 2002/0059637 A1 | 5/2002 | Rakib |
| 2002/0059642 A1 | 5/2002 | Russ et al. ................ 725/135 |
| 2002/0066101 A1 | 5/2002 | Gordon et al. |
| 2002/0067437 A1 | 6/2002 | Tsubouchi et al. |
| 2002/0069417 A1 | 6/2002 | Kliger et al. |
| 2002/0083438 A1 | 6/2002 | So et al. |
| 2002/0087996 A1 | 7/2002 | Bi et al. |
| 2002/0090198 A1 | 7/2002 | Rosenberg et al. |
| 2002/0095673 A1 | 7/2002 | Leung et al. |
| 2002/0095689 A1 | 7/2002 | Novak |
| 2002/0100041 A1 | 7/2002 | Rosenberg et al. |
| 2002/0104001 A1 | 8/2002 | Lotspiech et al. |
| 2002/0108109 A1 | 8/2002 | Harris et al. |
| 2002/0108121 A1 | 8/2002 | Alao et al. |
| 2002/0116626 A1 | 8/2002 | Wood |
| 2002/0122045 A1 | 9/2002 | Woodson et al. |
| 2002/0133558 A1 | 9/2002 | Fenno et al. |
| 2002/0137517 A1 | 9/2002 | Williams et al. |
| 2002/0138830 A1 | 9/2002 | Nagaoka et al. |
| 2002/0141582 A1 | 10/2002 | Kocher et al. |
| 2002/0144262 A1 | 10/2002 | Plotnick et al. |
| 2002/0146237 A1 | 10/2002 | Safadi |
| 2002/0154892 A1 | 10/2002 | Hoshen et al. |
| 2002/0157112 A1 | 10/2002 | Kuhn |
| 2002/0166124 A1 | 11/2002 | Gurantz et al. |
| 2002/0174430 A1 | 11/2002 | Ellis et al. |
| 2002/0174433 A1 | 11/2002 | Baumgartner et al. |

| Publication No. | Date | Inventor |
|---|---|---|
| 2002/0174444 A1 | 11/2002 | Gatto et al. |
| 2002/0178445 A1 | 11/2002 | Eldering |
| 2002/0187779 A1 | 12/2002 | Freeny |
| 2002/0194596 A1 | 12/2002 | Srivastava |
| 2002/0196941 A1 | 12/2002 | Isaacson et al. |
| 2002/0198762 A1 | 12/2002 | Donato ............ 705/10 |
| 2002/0199188 A1 | 12/2002 | Sie et al. |
| 2003/0005300 A1 | 1/2003 | Noble et al. |
| 2003/0005452 A1 | 1/2003 | Rodriguez |
| 2003/0009763 A1 | 1/2003 | Crinon et al. |
| 2003/0014750 A1 | 1/2003 | Kamen ............. 725/25 |
| 2003/0026423 A1 | 2/2003 | Unger et al. |
| 2003/0028886 A1 | 2/2003 | Wang et al. |
| 2003/0028890 A1 | 2/2003 | Swart et al. |
| 2003/0044165 A1 | 3/2003 | Wood et al. |
| 2003/0063003 A1 | 4/2003 | Bero et al. |
| 2003/0063814 A1 | 4/2003 | Herley |
| 2003/0069964 A1 | 4/2003 | Shteyn et al. |
| 2003/0074565 A1 | 4/2003 | Wasilewski et al. |
| 2003/0093812 A1* | 5/2003 | Chang et al. ............ 725/133 |
| 2003/0097563 A1 | 5/2003 | Moroney et al. |
| 2003/0097655 A1 | 5/2003 | Novak |
| 2003/0097663 A1 | 5/2003 | Puputti ............ 725/132 |
| 2003/0108199 A1 | 6/2003 | Pinder et al. |
| 2003/0108336 A1 | 6/2003 | Schramel |
| 2003/0123664 A1 | 7/2003 | Pedlow, Jr. et al. |
| 2003/0135859 A1 | 7/2003 | Putterman et al. ............ 725/78 |
| 2003/0142664 A1 | 7/2003 | Gerszberg et al. |
| 2003/0145336 A1 | 7/2003 | Matsuzaki et al. |
| 2003/0149986 A1 | 8/2003 | Mayfield et al. |
| 2003/0149991 A1 | 8/2003 | Reidhead et al. |
| 2003/0154477 A1 | 8/2003 | Hassell et al. |
| 2003/0159140 A1 | 8/2003 | Candelore |
| 2003/0159157 A1 | 8/2003 | Chan |
| 2003/0177495 A1 | 9/2003 | Needham et al. |
| 2003/0181160 A1 | 9/2003 | Hirsch |
| 2003/0192047 A1 | 10/2003 | Gaul et al. ............ 725/39 |
| 2003/0192061 A1 | 10/2003 | Hwangbo et al. |
| 2003/0202772 A1 | 10/2003 | Dow et al. |
| 2003/0204856 A1 | 10/2003 | Buxton |
| 2003/0207672 A1 | 11/2003 | Dang et al. |
| 2003/0233667 A1 | 12/2003 | Umipig et al. |
| 2003/0235308 A1 | 12/2003 | Boynton et al. ............ 380/270 |
| 2003/0237093 A1 | 12/2003 | Marsh |
| 2004/0003393 A1 | 1/2004 | Gutta et al. ............ 725/25 |
| 2004/0012717 A1 | 1/2004 | Sprague et al. ............ 348/564 |
| 2004/0017913 A1 | 1/2004 | Hawkes et al. ............ 380/37 |
| 2004/0025179 A1 | 2/2004 | Russ et al. ............ 725/46 |
| 2004/0028216 A1 | 2/2004 | Freyman |
| 2004/0032902 A1 | 2/2004 | Koifman et al. |
| 2004/0032950 A1 | 2/2004 | Graunke |
| 2004/0034874 A1 | 2/2004 | Hord et al. |
| 2004/0040035 A1 | 2/2004 | Carlucci et al. |
| 2004/0049793 A1 | 3/2004 | Chou ............ 725/87 |
| 2004/0051638 A1 | 3/2004 | Green |
| 2004/0054771 A1 | 3/2004 | Roe et al. |
| 2004/0060072 A1 | 3/2004 | Klein ............ 725/127 |
| 2004/0003398 A1 | 4/2004 | Donian et al. |
| 2004/0064714 A1 | 4/2004 | Carr |
| 2004/0068739 A1 | 4/2004 | Russ |
| 2004/0068744 A1 | 4/2004 | Claussen et al. ............ 725/81 |
| 2004/0068747 A1 | 4/2004 | Robertson |
| 2004/0068752 A1 | 4/2004 | Parker |
| 2004/0068753 A1 | 4/2004 | Robertson et al. |
| 2004/0068754 A1 | 4/2004 | Russ |
| 2004/0078825 A1 | 4/2004 | Murphy |
| 2004/0100897 A1 | 4/2004 | Shattil |
| 2004/0090971 A1 | 5/2004 | Anderson |
| 2004/0104926 A1 | 6/2004 | Murray et al. |
| 2004/0107445 A1 | 6/2004 | Amit |
| 2004/0109497 A1 | 6/2004 | Koval |
| 2004/0117483 A1 | 6/2004 | Singer et al. |
| 2004/0117831 A1 | 6/2004 | Ellis et al. ............ 725/53 |
| 2004/0128681 A1 | 7/2004 | Hancock |
| 2004/0128682 A1 | 7/2004 | Liga |
| 2004/0133911 A1 | 7/2004 | Russ et al. ............ 725/69 |
| 2004/0163130 A1 | 8/2004 | Gray et al. |
| 2004/0172658 A1 | 9/2004 | Rakib et al. |
| 2004/0177369 A1 | 9/2004 | Akins, III |
| 2004/0177381 A1 | 9/2004 | Kliger et al. |
| 2004/0220791 A1 | 11/2004 | Lamkin et al. |
| 2004/0221304 A1 | 11/2004 | Sparrel |
| 2004/0221308 A1 | 11/2004 | Cuttner et al. |
| 2004/0250272 A1 | 12/2004 | Durden et al. ............ 725/25 |
| 2004/0250273 A1 | 12/2004 | Swix et al. ............ 725/25 |
| 2004/0255326 A1* | 12/2004 | Hicks et al. ............ 725/81 |
| 2004/0257976 A1 | 12/2004 | Alsobrook et al. |
| 2004/0261100 A1 | 12/2004 | Huber et al. |
| 2004/0261126 A1 | 12/2004 | Addington et al. |
| 2005/0004873 A1 | 1/2005 | Pou et al. |
| 2005/0005287 A1 | 1/2005 | Claussen ............ 725/31 |
| 2005/0022248 A1 | 1/2005 | Robertson et al. |
| 2005/0028190 A1 | 2/2005 | Rodriguez et al. |
| 2005/0028208 A1* | 2/2005 | Ellis et al. ............ 725/58 |
| 2005/0042999 A1 | 2/2005 | Rappaport |
| 2005/0050557 A1 | 3/2005 | Gabryjelski et al. |
| 2005/0063422 A1 | 3/2005 | Lazar et al. |
| 2005/0065780 A1 | 3/2005 | Wiser et al. |
| 2005/0073945 A1 | 4/2005 | Garcia, Jr. et al. |
| 2005/0076357 A1 | 4/2005 | Fenne |
| 2005/0155052 A1 | 7/2005 | Ostrowska |
| 2005/0235323 A1 | 10/2005 | Ellis et al. |
| 2005/0251824 A1 | 11/2005 | Thomas et al. |
| 2005/0251827 A1 | 11/2005 | Ellis et al. |
| 2005/0262542 A1 | 11/2005 | DeWeese et al. |
| 2005/0234992 A1 | 12/2005 | Haberman |
| 2006/0069645 A1 | 3/2006 | Chen et al. |
| 2006/0080360 A1 | 4/2006 | Young et al. |
| 2006/0095939 A1* | 5/2006 | Jutzi ............ 725/78 |
| 2006/0117354 A1 | 6/2006 | Schutte et al. ............ 725/78 |
| 2006/0150225 A1 | 7/2006 | Hegg et al. |
| 2006/0184967 A1 | 8/2006 | Maynard et al. |
| 2006/0218581 A1 | 9/2006 | Ostrowska et al. ............ 725/38 |
| 2006/0218591 A1 | 9/2006 | Billmaier et al. |
| 2006/0259584 A1 | 11/2006 | Watson et al. |
| 2007/0022307 A1 | 1/2007 | Ferrari |
| 2007/0077038 A1 | 4/2007 | Wall |
| 2007/0079341 A1 | 4/2007 | Russ et al. |
| 2007/0094698 A1 | 4/2007 | Bountour et al. |
| 2007/0143776 A1 | 6/2007 | Russ et al. ............ 725/14 |
| 2007/0300258 A1 | 12/2007 | O'Connor et al. |
| 2008/0066085 A1 | 3/2008 | Davies et al. ............ 719/321 |
| 2008/0072272 A1 | 3/2008 | Robertson et al. |
| 2008/0148325 A1 | 6/2008 | Robertson et al. ............ 725/98 |
| 2008/0201758 A1 | 8/2008 | Davies et al. ............ 725/133 |
| 2008/0271094 A1 | 10/2008 | Kliger et al. |
| 2008/0301738 A1 | 12/2008 | Davies et al. ............ 725/87 |
| 2009/0077586 A1 | 3/2009 | Wall et al. |
| 2009/0083819 A1 | 3/2009 | Robertson et al. ............ 725/118 |
| 2009/0150922 A1 | 6/2009 | Russ et al. |
| 2009/0193452 A1 | 7/2009 | Russ et al. |
| 2009/0249176 A1 | 10/2009 | Jarman |
| 2010/0175093 A1 | 7/2010 | Arnold et al. |

FOREIGN PATENT DOCUMENTS

| | | |
|---|---|---|
| EP | 0 912 054 | 4/1999 |
| EP | 0 989 557 | 3/2000 |
| EP | 1 028 551 | 8/2000 |
| EP | 0 107 600 | 6/2001 |
| EP | 1 117 214 | 7/2001 |
| EP | 1 175 087 | 7/2001 |
| EP | 1145244 A1 | 10/2001 |
| EP | 1 213 919 | 6/2002 |
| EP | 1 443 766 | 8/2004 |
| EP | 1 463 324 | 9/2004 |
| WO | WO 95/25402 | 9/1995 |
| WO | WO 96/19079 | 6/1996 |
| WO | WO 98/26584 | 6/1998 |
| WO | WO 98/37648 | 8/1998 |
| WO | WO 99/01984 | 1/1999 |
| WO | WO 99/35844 | 7/1999 |
| WO | WO 99/65244 | 12/1999 |
| WO | WO 00/04707 | 1/2000 |
| WO | WO 00/04709 | 1/2000 |
| WO | WO 00/07372 | 2/2000 |
| WO | WO 00/45590 | 3/2000 |
| WO | WO 00/35201 | 6/2000 |
| WO | WO 01/01677 | 1/2001 |

| | | |
|---|---|---|
| WO | WO 01/47234 | 6/2001 |
| WO | WO 01/56286 | 8/2001 |
| WO | WO 01/56297 | 8/2001 |
| WO | WO 01/74003 | 10/2001 |
| WO | WO 01/78382 | 10/2001 |
| WO | WO 01/86948 | 11/2001 |
| WO | WO 02/07378 | 1/2002 |
| WO | WO 02/11418 | 2/2002 |
| WO | WO 02/11446 | 2/2002 |
| WO | WO 02/17642 | 2/2002 |
| WO | WO 02/19623 | 3/2002 |
| WO | WO 02/47388 | 6/2002 |
| WO | WO 02/097997 | 12/2002 |
| WO | WO 03/032620 | 4/2003 |
| WO | WO 03/039154 | 5/2003 |
| WO | WO 2004/023717 | 3/2004 |
| WO | WO 2004/032514 | 4/2004 |
| WO | WO 2004/036808 | 4/2004 |
| WO | WO 2004/036892 | 4/2004 |
| WO | WO 2004/064296 | 7/2004 |
| WO | WO 2004/098190 | 11/2004 |
| WO | WO 2005/034515 | 4/2005 |
| WO | WO 2006/093741 | 9/2006 |

OTHER PUBLICATIONS

Microsoft Computer Dictionary, 1999, Microsoft Press, 4th Edition, p. 123.

SCTE, "POD Copy Protection System," SCTE Society of Cable Telecommunications Engineers, [Online] Dec. 31, 2004, pp. 1-68, XP002414048, http://www.scte.org/documents/pdf/ANSISCTE412004.pdf.

Delta Beta In-Flight, www.deltabeta.com, retrieved from the internet on Jul. 17, 2008.

Written Opinion mailed Nov. 7, 2005 in PCT Application No. PCT/US2005/016290.

International Search Report dated Oct. 31, 2005 in PCT Application No. PCT/US2005/016290.

EP Communication dated Jul. 12, 2007 in Application No. 05 748 223.4-1241.

International Preliminary Examination Report dated Dec. 21, 2005 in PCT/US2003/32527.

Written Opinion mailed Dec. 10, 2004 in PCT/US2003/32527.

International Search Report dated Nov. 10, 2004 in PCT/US2003/32527.

International Preliminary Examination Report dated Jan. 18, 2006 in PCT/US2003/33686.

Written Opinion mailed Jun. 3, 2005 in PCT/US2003/33686.

International Search Report dated Feb. 6, 2004 in PCT/US2003/33686.

Canadian Office Action dated May 30, 2008 in Application No. 2,520,505.

Canadian Office Action dated Sep. 4, 2008 in Application No. 2,501,865.

International Search Report dated Sep. 29, 2006 in PCT/US2006/006199.

Written Opinion dated Oct. 12, 2006 in PCT/US2006/006199.

International Search Report dated Jan. 10, 2007 in PCT/US2006/033967.

Written Opinion mailed Mar. 2, 2007 in PCT/US2006/033967.

EP Communication dated Oct. 14, 2009 in Application No. 03 777 604.4-1241.

Supplementary European Search Report dated Jun. 18, 2009 in Application No. 03 777 604.4.

EP Communication dated Jun. 27, 2009 in Application No. 03 774 942.1.

Supplementary European Search Report dated Feb. 6, 2009 in Application No. 03 774 942.1-1241.

U.S. Official Action mailed Dec. 5, 2003 in U.S. Appl. No. 10/235,201.

U.S. Official Action mailed Feb. 13, 2004 in U.S. Appl. No. 10/342,670.

U.S. Official Action mailed May 7, 2004 in U.S. Appl. No. 10/235,201.

U.S. Official Action mailed Jul. 24, 2004 in U.S. Appl. No. 10/342,670.

U.S. Official Action mailed Sep. 10, 2004 in U.S. Appl. No. 10/437,556.

U.S. Official Action mailed Mar. 21, 2005 in U.S. Appl. No. 10/212,017.

U.S. Official Action mailed Mar. 23, 2005 in U.S. Appl. No. 10/342,670.

U.S. Official Action mailed Jun. 15, 2005 in U.S. Appl. No. 10/437,556.

U.S. Official Action mailed Jul. 27, 2005 in U.S. Appl. No. 10/235,201.

U.S. Official Action mailed Aug. 11, 2005 in U.S. Appl. No. 10/342,670.

U.S. Official Action mailed Oct. 19, 2005 in U.S. Appl. No. 10/212,017.

U.S. Official Action mailed Jan. 11, 2006 in U.S. Appl. No. 10/235,201.

U.S. Official Action mailed Jan. 30, 2006 in U.S. Appl. No. 10/437,556.

U.S. Official Action mailed Feb. 8, 2006 in U.S. Appl. No. 10/342,670.

U.S. Official Action mailed Apr. 19, 2006 in U.S. Appl. No. 10/212,017.

U.S. Official Action mailed Jun. 28, 2006 in U.S. Appl. No. 10/342,670.

U.S. Official Action mailed Jun. 30, 2006 in U.S. Appl. No. 10/437,556.

U.S. Official Action mailed Jul. 31, 2006 in U.S. Appl. No. 10/235,201.

U.S. Official Action mailed Oct. 31, 2006 in U.S. Appl. No. 10/342,670.

U.S. Official Action mailed Nov. 17, 2006 in U.S. Appl. No. 10/235,201.

U.S. Official Action mailed Nov. 20, 2006 in U.S. Appl. No. 10/437,556.

U.S. Official Action mailed May 3, 2007 in U.S. Appl. No. 10/437,556.

U.S. Official Action mailed May 4, 2007 in U.S. Appl. No. 10/263,160.

U.S. Official Action mailed May 4, 2007 in U.S. Appl. No. 10/924,077.

U.S. Official Action mailed May 7, 2007 in U.S. Appl. No. 10/342,670.

U.S. Official Action mailed May 8, 2007, in U.S. Appl. No. 10/263,449.

U.S. Official Action mailed Jul. 10, 2007 in U.S. Appl. No. 10/263,270.

U.S. Official Action mailed Sep. 4, 2007 in U.S. Appl. No. 10/712,289.

U.S. Official Action mailed Sep. 10, 2007 in U.S. Appl. No. 10/842,823.

U.S. Official Action mailed Nov. 15, 2007 in U.S. Appl. No. 10/924,077.

U.S. Official Action mailed Nov. 16, 2007 in U.S. Appl. No. 10/263,160.

U.S. Official Action mailed Nov. 30, 2007 in U.S. Appl. No. 10/263,449.

U.S. Official Action mailed Jan. 4, 2008 in U.S. Appl. No. 10/342,670.

U.S. Official Action mailed Jan. 14, 2008 in U.S. Appl. No. 10/263,270.

U.S. Official Action mailed Feb. 8, 2008 in U.S. Appl. No. 10/403,485.

U.S. Official Action mailed Mar. 18, 2008 in U.S. Appl. No. 10/924,077.

U.S. Official Action mailed Mar. 19, 2008 in U.S. Appl. No. 10/712,289.

U.S. Official Action mailed Apr. 4, 2008 in U.S. Appl. No. 10/842,823.

U.S. Official Action mailed May 13, 2008 in U.S. Appl. No. 10/263,160.

U.S. Official Action mailed Jun. 12, 2008 in U.S. Appl. No. 10/263,449.
U.S. Official Action mailed Jul. 8, 2008 in U.S. Appl. No. 11/069,439.
U.S. Official Action mailed Jul. 25, 2008 in U.S. Appl. No. 10/342,670.
U.S. Official Action mailed Sep. 5, 2008 in U.S. Appl. No. 10/263,270.
U.S. Official Action mailed Sep. 17, 2008 in U.S. Appl. No. 10/403,485.
U.S. Official Action mailed Sep. 19, 2008 in U.S. Appl. No. 10/263,160.
U.S. Official Action mailed Sep. 26, 2008 in U.S. Appl. No. 10/212,017.
U.S. Official Action mailed Oct. 21, 2008 in U.S. Appl. No. 10/842,823.
U.S. Official Action mailed Oct. 22, 2008 in U.S. Appl. No. 10/924,077.
U.S. Official Action mailed Oct. 29, 2008 in U.S. Appl. No. 10/712,289.
U.S. Official Action mailed Nov. 26, 2008 in U.S. Appl. No. 11/069,439.
U.S. Official Action mailed Jan. 28, 2009 in U.S. Appl. No. 10/342,670.
U.S. Official Action mailed Feb. 6, 2009 in U.S. Appl. No. 10/263,270.
U.S. Official Action mailed Feb. 14, 2009 in U.S. Appl. No. 10/263,449.
U.S. Official Action mailed Mar. 13, 2009 in U.S. Appl. No. 11/069,439.
U.S. Official Action mailed Mar. 18, 2009 in U.S. Appl. No. 10/403,485.
U.S. Official Action mailed Apr. 3, 2009 in U.S. Appl. No. 10/263,160.
U.S. Official Action mailed Apr. 15, 2009 in U.S. Appl. No. 10/712,289.
U.S. Official Action mailed Jul. 29, 2009 in U.S. Appl. No. 10/924,077.
U.S. Official Action mailed Aug. 28, 2009 in U.S. Appl. No. 10/263,449.
U.S. Official Action mailed Sep. 1, 2009 in U.S. Appl. No. 10/263,270.
U.S. Official Action mailed Sep. 3, 2009 in U.S. Appl. No. 10/403,485.
U.S. Official Action mailed Sep. 11, 2009 in U.S. Appl. No. 10/263,160.
U.S. Official Action mailed Sep. 29, 2009 in U.S. Appl. No. 10/712,289.
U.S. Official Action mailed Sep. 30, 2009 in U.S. Appl. No. 11/069,439.
U.S. Official Action mailed Oct. 16, 2009 in U.S. Appl. No. 12/056,812.
EP Summons to attend oral proceedings dated Jan. 27, 2010 in Application No. 03 774 942.1-1241.
U.S. Official Action mailed Nov. 16, 2009 in U.S. Appl. No. 10/907,540.
U.S. Official Action mailed Nov. 30, 2009 in U.S. Appl. No. 10/998,879.
U.S. Official Action mailed Dec. 16, 2009 in U.S. Appl. No. 10/294,947.
U.S. Official Action mailed Dec. 16, 2009 in U.S. Appl. No. 11/564,347.
U.S. Official Action mailed Jan. 12, 2010 in U.S. Appl. No. 10/104,921.
U.S Official Action mailed Jan. 21, 2010 in U.S. Appl. No. 11/069,439.
U.S. Official Action mailed Jan. 28, 2010 in U.S. Appl. No. 10/924,077.
U.S. Appl. No. 09/332,244, filed Jun. 11, 1999 entitled "Client-Server Based Interactive Television Program Guide System With Remote Server Recording", Inventors: Michael Ellis, William Thomas, Thomas Lemmons.
U.S. Appl. No. 09/354,344, filed Jul. 16, 1999 entitled "Interactive Television Program Guide With Remote Access", Inventors: Michael Ellis, William Thomas, Joel Hassell, Thomas Lemmons, David Berezowski, Robert Knee, Robert McCoy.
U.S. Appl. No. 09/356,161, filed Jul. 16, 1999 entitled "Interactive Television Program Guide System Having Multiple Devices Within A Household", Inventors: Michael Ellis, William Thomas, Thomas Lemmons.
SCTE, "Client-Based Digital Program Insertion Business Goal," DVS/632r1, Mar. 27, 2004.
SCTE, "Working Group Work Plan 5," DVS 177, Sep. 1, 1998.
SCTE, "Proposed Amendment of SCTE 30 2001 Digital Program Insertion Splicing API," DV 638r3, Feb. 4, 2005.
Broadcast Engineering, "Digital Program Insertion," Business Models, Jul. 1, 2002.
nCUBE, "Digital Program Insertion," nCUBE, May 2001.
Matsushita Electric Industrial Co., Ltd. "DVB Call for Proposals for Content Protection & Copy Management Technologies," NetDRM Technology, XP002349078, Oct. 19, 2001, pp. 1-44.
International Search Report dated Mar. 1, 2005 in PCT/US2004/032389.
Supplementary European Search Report dated Jul. 14, 2005 in Application No. 03 74 5552.
International Search Report dated Jan. 25, 2007 in PCT/US2006/037542.
Written Opinion dated Jan. 25, 2007 in PCT/US2006/037542.
International Search Report dated Oct. 29, 2007 in PCT/US2006/060967.
Written Opinion dated Oct. 29, 2007 in PCT/US2006/060967.
EP Communication dated Mar. 10, 2008 in Application No. 05 852 294.7.
International Search Report dated Jun. 9, 2008 in PCT/US2007/085694.
EP Communication dated Jul. 18, 2008 in Application No. 05 852 294.7.
EP Communication dated Feb. 27, 2009 in Application No. 06 739 511.1.
EP Communication dated Apr. 6, 2009 in Application No. 05 852 294.7-1522.
Canadian Office Action dated Apr. 15, 2009 in Application No. 2,478,838.
Canadian Office Action dated Jul. 24, 2009 in Application No. 2,566,742.
EP Communication dated Aug. 24, 2009 in Application No. 06 735 737.7-1241.
Canadian Office Action dated Oct. 5, 2009 in Application No. 2,588,912.
EP Communication dated Oct. 29, 2009 in Application No. 06 815 494.7.
Canadian Office Action dated Nov. 2, 2009 in Application No. 2,599,947.
Canadian Office Action dated Nov. 2, 2009 in Application No. 2,603,257.
Canadian Office Action dated Dec. 15, 2009 in Application No. 2,520,505.
Canadian Office Action dated Jan. 13, 2010 in Application No. 2,541,161.
EP Summons to attend oral proceedings dated Jan. 27, 2010 in Application No. 03 774 942.1-1241.
Canadian Office Action dated Mar. 4, 2010 in Application No. 2,599,941.
EP Communication dated Mar. 18, 2010 in Application No. 06 815 494.7.
EP Communication dated Apr. 12, 2010 in Application No. 03 777 604.4-1241.
Canadian Office Action dated Jul. 2, 2010 in Application No. 2,630,123.
U.S. Official Action mailed May 31, 2005 in U.S. Appl. No. 09/332,244.
U.S. Official Action mailed Mar. 13, 2006 in U.S. Appl. No. 10/008,581.
U.S. Official Action mailed Sep. 20, 2006 in U.S. Appl. No. 10/036,329.

U.S. Official Action mailed Dec. 18, 2006 in U.S. Appl. No. 10/008,581.
U.S. Official Action mailed Dec. 19, 2006 in U.S. Appl. No. 09/332,244.
U.S. Official Action mailed Mar. 21, 2007 in U.S. Appl. No. 10/294,947.
U.S. Official Action mailed Apr. 25, 2007 in U.S. Appl. No. 10/008,581.
U.S. Official Action mailed May 29, 2007 in U.S. Appl. No. 10/036,329.
U.S. Official Action mailed Jun. 27, 2007 in U.S. Appl. No. 09/332,244.
U.S. Official Action mailed Jul. 10, 2007 in U.S. Appl. No. 10/104,921.
U.S. Official Action mailed Oct. 4, 2007 in U.S. Appl. No. 10/008,581.
U.S. Official Action mailed Oct. 5, 2007 in U.S. Appl. No. 10/294,947.
U.S. Official Action mailed Nov. 2, 2007 in U.S. Appl. No. 10/676,968.
U.S. Official Action mailed Nov. 29, 2007 in U.S. Appl. No. 10/104,921.
U.S. Official Action mailed Jan. 10, 2008 in U.S. Appl. No. 10/923,948.
U.S. Official Action mailed Mar. 18, 2008 in U.S. Appl. No. 10/008,581.
U.S. Official Action mailed Apr. 24, 2008 in U.S. Appl. No. 10/104,921.
U.S. Official Action mailed May 1, 2008 in U.S. Appl. No. 10/923,948.
U.S. Official Action mailed May 15, 2008 in U.S. Appl. No. 10/294,947.
U.S. Official Action mailed Jun. 2, 2008 in U.S. Appl. No. 10/998,879.
U.S. Official Action mailed Jun. 30, 2008 in U.S. Appl. No. 10/907,540.
U.S. Official Action mailed Jul. 9, 2008 in U.S. Appl. No. 11/069,440.
U.S. Official Action mailed Jul. 23, 2008 in U.S. Appl. No. 10/676,968.
U.S. Official Action mailed Sep. 18, 2008 in U.S. Appl. No. 10/008,581.
U.S. Official Action mailed Nov. 6, 2008 in U.S. Appl. No. 10/104,921.
U.S. Official Action mailed Nov. 28, 2008 in U.S. Appl. No. 10/998,879.
U.S. Official Action mailed Dec. 12, 2008 in U.S. Appl. No. 10/294,947.
U.S. Official Action mailed Dec. 23, 2008 in U.S. Appl. No. 11/163,107.
U.S. Official Action mailed Dec. 26, 2008 in U.S. Appl. No. 11/164,337.
U.S. Official Action mailed Jan. 7, 2009 in U.S. Appl. No. 10/904,540.
U.S. Official Action mailed Jan. 23, 2009 in U.S. Appl. No. 11/169,440.
U.S. Official Action mailed Feb. 9, 2009 in U.S. Appl. No. 10/008,581.
U.S. Official Action mailed Mar. 2, 2009 in U.S. Appl. No. 11/564,347.
U.S. Official Action mailed Apr. 6, 2009 in U.S. Appl. No. 11/945,284.
U.S. Official Action mailed May 21, 2009 in U.S. Appl. No. 10/294,947.
U.S. Official Action mailed May 21, 2009 in U.S. Appl. No. 10/998,879.
U.S. Official Action mailed Jun. 10, 2009 in U.S. Appl. No. 10/907,540.
U.S. Official Action mailed Jun. 11, 2009 in U.S. Appl. No.10/ 104,921.
U.S. Official Action mailed Jul. 21, 2009 in U.S. Appl. No. 11/164,337.
U.S. Official Action mailed Aug. 19, 2009 in U.S. Appl. No. 11/069,440.
U.S. Official Action mailed Sep. 4, 2009 in U.S. Appl. No. 11/564,347.
U.S. Official Action mailed Oct. 6, 2009 in U.S. Appl. No.12/ 352,140.
U.S. Official Action mailed Oct. 29, 2009 in U.S. Appl. No. 11/945,284.
U.S. Official Action mailed Dec. 30, 2009 in U.S. Appl. No. 11/164,337.
U.S. Official Action mailed Jan. 14, 2010 in U.S. Appl. No. 10/104,921.
U.S. Official Action mailed Feb. 17, 2010 in U.S. Appl. No. 10/263,449.
U.S. Official Action mailed Feb. 24, 2010 in U.S. Appl. No. 10/403,485.
U.S. Official Action mailed Mar. 1, 2010 in U.S. Appl. No. 10/712,289.
U.S. Official Action mailed Mar. 3, 2010 in U.S. Appl. No. 10/263,160.
U.S. Official Action mailed Apr. 7, 2010 in U.S. Appl. No. 12/056,812.
U.S. Official Action mailed May 5, 2010 in U.S. Appl. No. 10/998,879.
U.S. Official Action mailed May 18, 2010 in U.S. Appl. No. 10/907,540.
U.S. Official Action mailed May 25, 2010 in U.S. Appl. No. 11/069,439.
U.S. Official Action mailed May 26, 2010 in U.S. Appl. No. 10/263,270.
U.S. Official Action mailed Jun. 8, 2010 in U.S. Appl. No.11/ 564,347.
U.S. Official Action mailed Jul. 16, 2010 in U.S. Appl. No. 11/164,337.
U.S. Official Action mailed Jul. 27, 2010 in U.S. Appl. No. 10/924,077.
U.S. Official Action mailed Aug. 17, 2010 in U.S. Appl. No.12/ 036,329.
U.S. Official Action mailed Aug. 20, 2010 in U.S. Appl. No. 11/945,284.
U.S. Official Action mailed Aug. 27, 2010 in U.S. Appl. No. 10/403,485.
U.S. Official Action mailed Aug. 31, 2010 in U.S. Appl. No. 12/416,392.
U.S. Official Action mailed Sep. 9, 2010 in U.S. Appl. No. 10/998,879.
U.S. Official Action mailed Sep. 14, 2010 in U.S. Appl. No.11/ 942,077.
U.S. Appl. No. 09/262,870 filed Mar. 4, 1999 entitled "Program Guide System with Video-On-Demand Browsing," Inventors: Michael D. Ellis.
U.S. Appl. No. 09/332,244 filed Jun. 11, 1999 entitled "Client-Server Based Interactive Television Program Guide System With Remote Server Recording", Inventors: Michael Ellis, William Thomas, Thomas Lemmons.
U.S. Appl. No. 09/354,344 filed Jul. 16, 1999 entitled "Interactive Television Program Guide With Remote Access", Inventors: Michael Ellis, William Thomas, Joel Hassell, Thomas Lemmons, David Berezowski, Robert Knee, Robert McCoy.
U.S. Appl. No. 09/356,161 filed Jul. 16, 1999 entitled "Interactive Television Program Guide System Having Multiple Devices Within A Household", Inventors: Michael Ellis, William Thomas, Thomas Lemmons.
U.S. Appl. No. 09/568,932 filed May 11, 2000 entitled "Electronic Content Guide Renders Content Resources Transparent", Inventors: Eugene Shteyn et al.
Proakis, "Section 4.3.3, Non-linear modulation methods with memory," Digital Communications, Jan. 1, 1995, McGraw Hill, Singapore, XP002613053, ISBN: 0-07-113814-5, pp. 190-199.
EP Summons to attend oral proceedings dated Dec. 13, 2010 in Application No. 06 815 494.7.
U.S. Official Action mailed Oct. 15, 2010 in U.S. Appl. No. 10/907,540.

U.S. Official Action mailed Nov. 10, 2010 in U.S. Appl. No. 10/263,270.
U.S. Official Action mailed Nov. 23, 2010 in U.S. Appl. No. 10/263,449.
Canadian Office Action dated Dec. 3, 2010 in Application No. 2,478,838.
Canadian Office Action dated Dec. 17, 2010 in Application No. 2,497,013.
Canadian Office Action dated Jan. 27, 2011 in Application No. 2,621,382.
U.S. Official Action mailed Feb. 2, 2011 in U.S. Appl. No. 12/178,731.
U.S. Official Action mailed Feb. 2, 2011 in U.S. Appl. No. 12/036,329.
U.S. Official Action mailed Feb. 15, 2011 in U.S. Appl. No. 10/403,485.
EP Summons to attend oral proceedings dated Dec. 2, 2010 in Application No. 03 777 604.4.
Canadian Office Action dated Jan. 20, 2011 in Application No. 2,599,941.
U.S. Official Action mailed Mar. 18, 2011 in U.S. Appl. No. 11/943,077.
EP Communication dated Mar. 23, 2011 in Application No. 03 777 604.4.
EP Communication dated Mar. 31, 2011 in Application No. 03 799 378.9.
Canadian Office Action dated Apr. 13, 2011 in Application No. 2,630,123.
Canadian Office Action dated Apr. 20, 2011 in Application No. 2,588,912.
Canadian Office Action dated Apr. 20, 2011 in Application No. 2,566,742.
U.S. Office Action mailed Mar. 25, 2011 in Application No. 10/907,540.
U.S. Official Action mailed Apr. 1, 2011 in U.S. Appl. No. 12/416,392.
U.S. Official Action mailed Apr. 27, 2011 in U.S. Appl. No. 11/945,284.
U.S. Official Action mailed Jul. 6, 2011 in U.S. Appl. No. 12/178,731.
U.S. Official Action mailed Jul. 7, 2011 in U.S. Appl. No. 12/036,329.

* cited by examiner

MULTIROOM POINT OF DEPLOYMENT MODULE

CROSS-REFERENCE TO RELATED PATENT APPLICATIONS

The present application is a continuation-in-part of copending U.S. patent application entitled "Multi-Outlet Server System" having Ser. No. 10/342,670, which was filed Jan. 15, 2003, which incorporates by reference in its entirety herein U.S. provisional application having Ser. No. 60/416,155, which was filed on Oct. 4, 2002, and U.S. provisional application having Ser. No. 60/424,269, which was filed on Nov. 6, 2002.

FIELD OF THE INVENTION

This invention relates in general to broadband communications systems, and more particularly, to the field of digital-ready televisions in a networked multimedia system.

DESCRIPTION OF THE RELATED ART

Broadband communications systems, such as satellite and cable television systems, are now capable of providing many services in addition to analog broadcast video. In implementing enhanced programming, the set-top terminal (STT), otherwise known as the set-top box, has become an important computing device for accessing various video services. In addition to supporting traditional analog broadcast video functionality, many STTs now also provide other functionality, such as, for example, an interactive program guide (IPG), video-on-demand (VOD), subscription video-on-demand (SVOD) and functionality traditionally associated with a conventional computer, such as e-mail. Recently new functionality has been added to conventional STTs—namely the ability to record an incoming video stream in digitized form onto a mass storage device such as a hard dish drive, and playback that recorded video as desired by the user. This functionality has become known as a "digital video recorder" (DVR) or personal video recorder (PVR) and is viewed as a superior alternative to conventional video tape recorders for capture and subsequent playback of programming content.

Furthermore, digital televisions that are capable of receiving signals directly from the communications systems are now being used in the market. In this case, the television does not necessarily require a STT. Typically, the signals are encrypted prior to sending them through the communications systems, so a point of deployment (POD) module is required in order for the television to properly display the encrypted signals. A POD module, or CableCard, is inserted into the television set, and the card then decrypts the signals. The POD module may be one-way (i.e., decrypts incoming signals only) or two-way (i.e., decrypts incoming signals and transmits signals to the headend). A two-way CableCard is also referred to as an advanced multi-stream CableCard or AMS CableCard.

Television has become so prevalent in the United States, however, that the typical household may have two or more television sets, where each television set requires its own STT or POD module if the subscriber wishes to have access to enhanced functionality. However, STTs can be expensive and users may not be willing to purchase additional enhanced STTs. Additionally, the POD modules are unable to record video programs.

Therefore, there exists a need for systems and methods for addressing these and/or other problems associated with STTs and POD modules. Specifically, there exists a need for systems and methods that allow a cable-ready television including a POD module to have access to programming and content received by and/or stored in another STT within a subscriber premises or other local area.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, data, or Internet Protocol (IP) signals, to name but a few. Furthermore, remote devices included in the broadband communications system receiving the transmitted broadband signals may include a remote set-top terminal, a television, a television including a point of deployment (POD) module, a consumer electronics device such as a DVD player/recorder, a computer, a personal digital assistant (PDA), or other device. All examples given herein, therefore, are intended to be non-limiting and are provided in order to help clarify the description of the invention.

The present invention is directed towards a networked multimedia system (NMS) that is suitable for use in a broadband communications system. The NMS is typically located within a subscriber premise. It will be appreciated, however, that the NMS can also be used in a multi-unit dwelling, business, school, hotel, or hospital, among others. Advantageously, the NMS allows the premise to be locally networked (i.e., home-networked). In accordance with the present invention a primary, or server, set-top terminal (STT) typically receives and forwards broadband multimedia content signals (e.g., digital or analog cable television channels (i.e., audio/video signals), IP signals, VOD signals, software application signals, administrative signals, etc.) throughout the local network to a plurality of remote devices. Additionally, the remote devices are each capable of requesting from the primary STT and seamlessly receiving, for example, a cable channel, a stored or recorded presentation, a VOD movie, or the interactive program guide, just as if the remote devices were equipped with the primary STT functionality. In other words, the remote devices may be simplified, less-costly versions of the primary STT but are capable of utilizing, via the local network, some or all of the advanced hardware and software features, such as memory, a mass storage device, or software applications, that are available in the primary STT. A broadband communications system that is suitable in implementing a preferred embodiment of the present invention is described hereinbelow.

An Example of a Broadband Communications System

Figure 1:
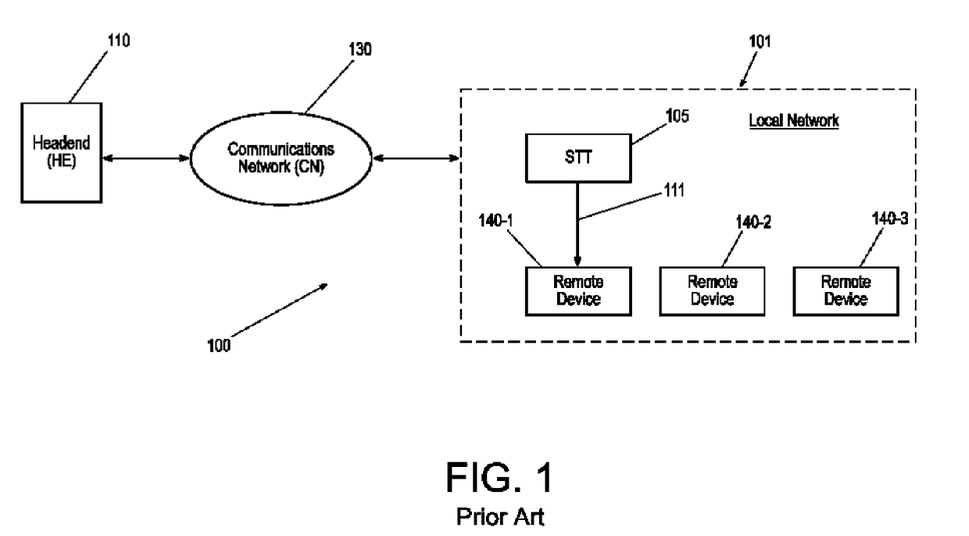
FIG. 1 is a simplified block diagram depicting a non-limiting example of a conventional broadband communications system.

FIG. 1 is a simplified block diagram depicting a non-limiting example of a conventional broadband communications system 100. In this example, the communications system 100 includes a headend 110 that is coupled to a local network (LN) 101 via a communications network (CN) 130. The CN 130 may be any network that is suitable for transmitting downstream and upstream broadband multimedia signals, such as audio/video signals, IP signals, telephony signals, or data signals to name but a few. The CN 130 may be, for example, a hybrid fiber/coax (HFC) network, a fiber-to-the-home (FTTH) network, a satellite network, or a fixed wireless network (e.g., MMDS), among others.

The LN 101 includes a set-top terminal (STT) 105 that provides the broadband signals to the remote devices 140-1 and 140-2, and, optionally, to additional remote devices including, for example, remote device 140-3. The STT 105 may be coupled to the remote devices either directly or via one or more other devices. It will be appreciated that the STT 105 may be a stand-alone unit or may be integrated into another device, such as, for example, a television or a computer. Additionally, the remote devices may be located in different rooms than where the STT 105 is located. Further information regarding the LN 101 is provided in copending U.S. patent application Ser. Nos. 10/263,160; 10/263,270; and 10/263,449, which were filed on Oct. 2, 2002, the disclosure and teachings of which are hereby incorporated in their entirety by reference.

The headend 110 may include one or more server devices (not shown) for providing video, audio, and/or data signals to the STT 105 via the CN 130. The headend 110 and the STT 105 cooperate to provide a user with a variety of services via the remote devices 140-i (e.g., 140-1, 140-2, and/or 140-3). The services may include, for example, analog or digital television services and channels, video-on-demand (VOD) services, and/or pay-per-view (PPV) services, among others. Each broadcast television channel typically provides a sequence of television presentations corresponding to a television station (e.g., ABC, NBC, CBS, or FNN, to name a few) and is typically identified by a channel number (e.g., channel 2, channel 3, channel 4, etc.). Additionally, a television station (e.g., the Fox News Network) that is identified by a certain channel number (e.g., channel 84) to viewers served by a first service provider may be identified by another channel number (e.g., channel 45) to viewers served by a second service provider.

Figure 2:
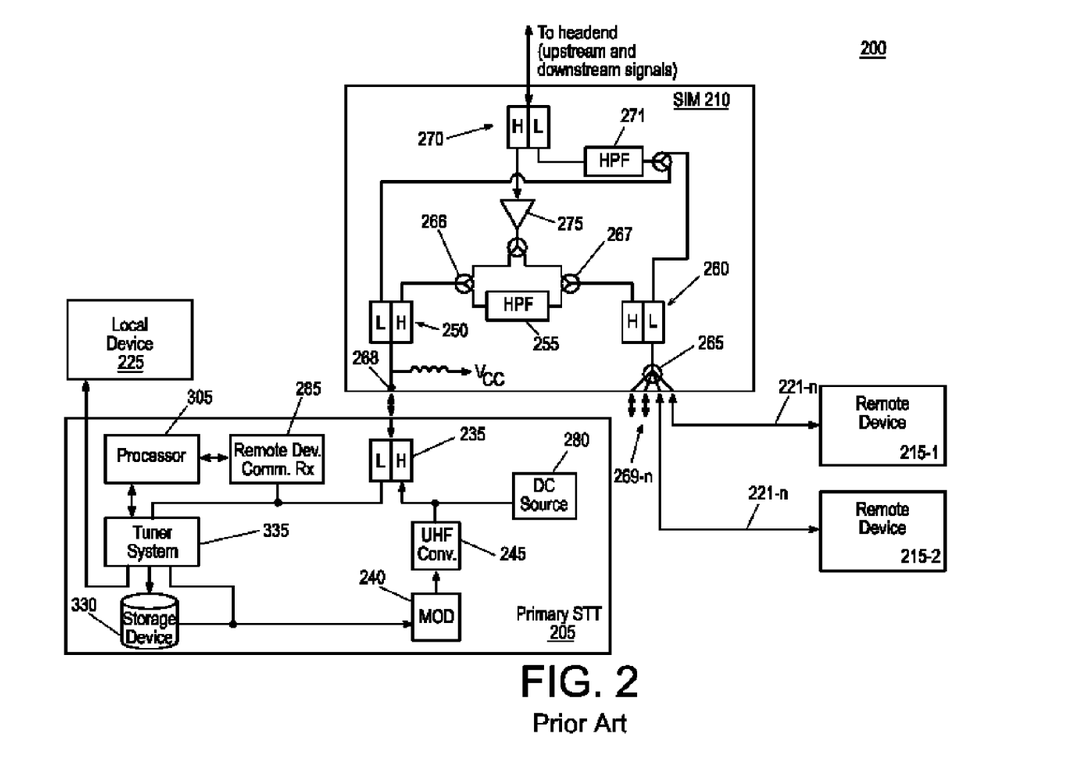
FIG. 2 is a block diagram illustrating one preferred embodiment of a networked multimedia system (NMS) in accordance with the present invention.

FIG. 2 is a block diagram illustrating one preferred embodiment of a networked multimedia system (NMS) 200 in accordance with the present invention. The NMS 200 includes a master or primary STT 205, a splitter/isolation module (SIM) 210, and a plurality of remote devices, e.g., 215-1, 215-2, 215-n. It is to be noted that while the embodiment of FIG. 2 illustrates an NMS having two remote devices, the invention is not so limited. Indeed, any number of such remote devices may be employed, consistent with the requirements and capabilities of the NMS, as described herein. Additionally, the remote devices 215-n can be any one of a set-top or a point of deployment (POD) module that is inserted into a digital-ready television.

Briefly, the SIM 210 receives downstream broadband signals from, for example, the headend or satellite and subsequently provides the downstream signals to the primary STT 205 or to both the primary STT 205 and any one or all of the plurality of remote devices 215-n depending on the implementation. Upon command, the primary STT 205 may also forward selected real-time downstream signals or stored signals to one or all of the remote devices 215-n via the SIM 210. More specifically, the plurality of remote devices 215-n communicates with the primary STT 205 by sending reverse control/command signals via coaxial cable 220, 221-n requesting stored presentations or real-time signals. It will be appreciated that other wired mediums, such as telephone lines or data cables, may be used so long as the transport format accommodates the desired transmission medium. Advantageously, in accordance with the present invention, the plurality of remote devices 215-n has access to the primary STT's hardware and software functionality, along with receiving downstream signals directly from the headend via the SIM 210. In this manner, the remote devices 215-n may have limited functionality, thereby decreasing the overall costs to the service provider and the subscriber while offering advanced services to all of the remote devices that are networked.

Furthermore, the primary STT 205 may also directly provide broadband signals to a coupled local device 225, which may be, for example, a television, computer, or PDA. It will be appreciated that the primary STT 205 may transmit signals to and receive control signals from the local device 225 via wireless devices (e.g., RF or IR devices) or a wired medium (e.g., coaxial cable, power lines, or telephone lines). It will also be appreciated that the primary STT 205 may be incorporated in the local device 225. The primary STT 205 optionally includes, for example, an IR receiver 368 (FIG. 3) for receiving user input control signals (e.g., signals indicating a channel change, IPG display, volume control, or administrative signals) that are encoded in an IR signal. Those of ordinary skill in the art would understand elements and operation of a typical IR receiver 368. Further information regarding the transmitting and receiving of signals between the primary STT and the coupled local device via wireless devices or a wired medium can be found in copending U.S. patent application Ser. No. 10/008,581, the teachings of which are hereby incorporated by reference.

A Preferred Embodiment of the Primary STT 205

Figure 3:
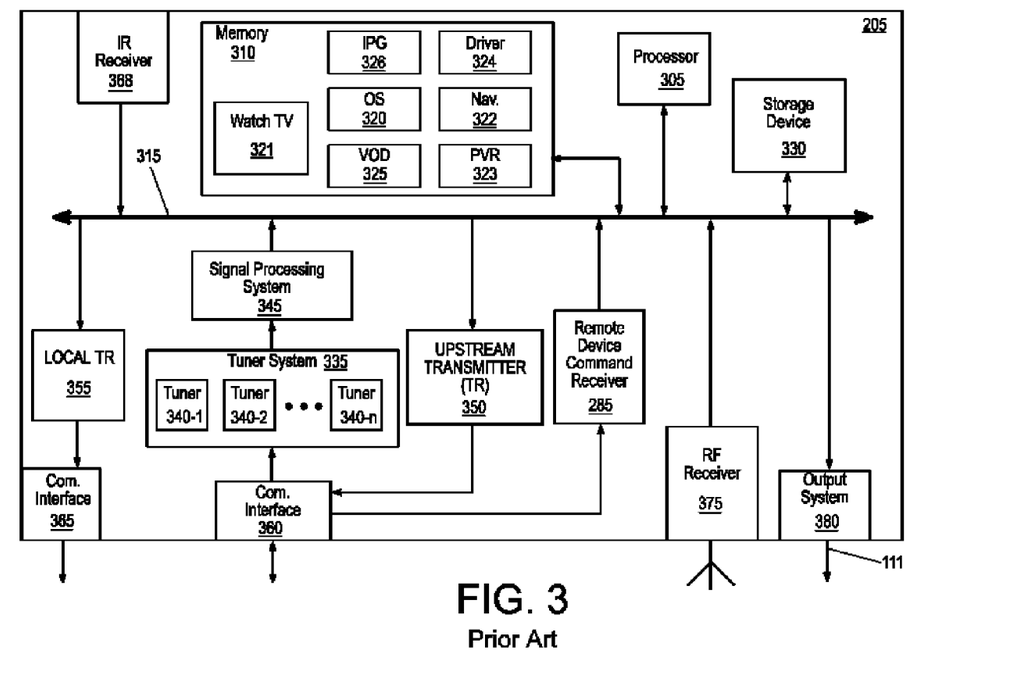
FIG. 3 is a simplified, non-limiting block diagram illustrating selected components of a primary STT in accordance with one preferred embodiment of the present invention.

FIG. 3 is a simplified, non-limiting block diagram illustrating selected components of a primary STT 205 in accordance with one preferred embodiment of the present invention. In other embodiments, a primary STT 205 may include only some of the components shown in FIG. 3, in addition to other components that are not shown in FIG. 3. The primary STT 205 has electronic components (e.g., processor 305, memory 310, etc.) that are coupled to a local interface 315, which can include, for example, one or more buses or other wired or wireless connections. The processor 305 is a hardware device for executing software, particularly that stored in memory 310. The processor 305 can be a custom-made or commercially available processor for executing software instructions. When the primary STT 205 is in operation, the processor 305 is configured to execute software stored within the memory 310, to communicate data to and from the memory 310, and to generally control operations of the primary STT 205 according to the software.

The memory system 310 may include any one or combination of volatile memory elements (e.g., random access memory (RAM), dynamic RAM (DRAM), static RAM (SRAM), synchronous DRAM (SDRAM), magnetic RAM (MRAM), etc.) and nonvolatile memory elements (e.g., read only memory (ROM), hard drive, tape, compact disc ROM (CD-ROM), etc.). Moreover, the memory system 310 may incorporate electronic, magnetic, optical and/or other types of storage multimedia. Note that the memory system 310 can have a distributed architecture, where various memory components are situated remotely from one another, but can be accessed by the processor 305.

The software in memory 310 may include one or more separate programs, each of which comprises executable instructions for implementing logical functions. In the example of FIG. 3, the software in memory 310 includes an operating system (OS) 320, a WatchTV application 321, a navigator application 322, a personal video recorder (PVR)/digital video recorder (DVR) application 323, a driver 324, a VOD application 325, and an IPG application 326, among others. The OS 320 controls the execution of other software and provides management and control services including, for example, scheduling, input-output control, file and data management, memory management, and communication control. The WatchTV application 321 is used to help provide a user with a requested broadcast television channel. The IPG application 326 provides an interactive program guide that mainly includes listings of television channels provided by the primary STT 205, but may also present additional services, such as an NMS interactive guide. The navigator application 322 is used to route user input commands to respective software applications that have registered with the navigator application 322 to receive the respective commands. The VOD application 325 provides a user with video-on-demand presentations, such as, for example, movies that are selected via an on-screen movie catalog. The PVR application 323 may provide user interface (UI) screens that can be used to manage (e.g., record, playback, and delete) the content of a storage device 330. Accordingly, the PVR application 323 may record or delete data from the storage device 330 with the help of a software driver 324, which controls read and write operations performed on the storage device 330. In one preferred embodiment, the storage device 330 includes a hard drive that reads from and writes to a hard disk. It will be appreciated that other software applications may be included in memory 310.

A tuner system 335 includes, in one implementation, an out-of-band tuner (not shown) for receiving out-of-band signals (e.g., administrative signals that were modulated using quaternary phase shift keying (QPSK)), and a plurality of in-band tuners 340-n (e.g., quadrature amplitude modulation (QAM)/analog tuners) for receiving analog and/or digital in-band television channels. Alternatively, the tuner system 335 may only include one in-band tuner depending on a desired implementation. A signal processing system 345 may be capable of demodulating, demultiplexing, decrypting, and decoding signals that are tuned to by the tuner system 335. Although shown as one module, the signal processing system may comprise multiple modules that are located in different parts of the primary STT 205. It will be appreciated that in the preferred embodiment of the present invention the number of tuners 340-n typically corresponds to at least the optional coupled local device(s) 225 and the storage device 330. Further information regarding adding additional tuners can be found in copending U.S. patent application Ser. No. 10/263,449, which was filed on Oct. 2, 2002, the teachings of which are hereby incorporated by reference.

The primary STT 205 also includes an upstream transmitter 350 and a local transmitter 355. The upstream transmitter 350, which may alternatively be included in the tuner system 335, preferably includes a QPSK/QAM modulator (not shown) that is used to transmit the upstream data to the CN 130 (FIG. 1). The local transmitter 355 preferably includes a UHF (ultra high frequency) modulator for modulating, for example, a television channel that is output to the local device 255 (FIG. 2) through an optional interface 365, such as for example an Ethernet wireless device, depending on a desired implementation.

The primary STT 205 may also include an IR receiver 368, a remote device command receiver 285, and/or an RF receiver 375, which detect respective signals (IR, electric, or wireless RF) having encoded remote control commands requesting television services, channels, or other NMS services. In one embodiment, the remote device command receiver 285 may forward received remote control signals from the plurality of remote devices 215-n to the processor 305, which then, for example, routes the commands to respective applications for processing.

An output system 380 may be used to encode television services that are to be output to, for example, local device 225 (FIG. 2), which may be a television or computer, via the connection 111. The output system 380 may provide a television 225 with signals that are in, for example, NTSC (National Television Standard Committee) format. In another embodiment, if the television 225 is a digital television, for example, a high definition television (HDTV), then the output system may include an MPEG (Motion Picture Expert Group) encoder for encoding television service signals in an MPEG-2 format. It will be appreciated that the primary STT 205 may also provide multimedia content signals to other remote devices (e.g., a computer, a remote set-top terminal, or a PDA) located in the network, such as illustrated in FIG. 1.

Referring to FIG. 2 in conjunction with FIG. 3, the primary STT 205 receives via the SIM 210 downstream broadband signals (i.e., signals that are typically in the range from 45 MHz to 870 MHz). A low pass filter in diplex filter 235 provides the downstream signals to the tuner system 335 and the remote device command receiver 285. Upon command from the processor 305, the tuner system 335 may send the downstream signals to any local devices 225, the storage device 330 for optional storage, and additionally to a modulator 240. More specifically, the processor 305 instructs the tuner system 335 to extract specified content signals from the downstream signals. By way of example, a tuner 340 responsive to the coupled local device 225 provides selected content signals directly to the local device 225. The tuner 340 or a plurality of tuners 340-n that are responsive to a remote device 215-n via the processor 305 may forward selected real-time presentations directly to the modulator 240 for transmission to the plurality of remote devices 215-n. Furthermore, upon user input from the primary STT 205 or any one of the remote devices 215-n, the processor 305 may instruct the tuner system 335 to provide content presentations to the storage device 330 for storage. The stored presentations are subsequently available for forwarding to any of the remote devices 215-n and/or the local device 255 upon instruction from the processor 305. User input signals will be discussed in further detail hereinbelow relating with a preferred embodiment of the remote devices 215-n.

Figure 4:
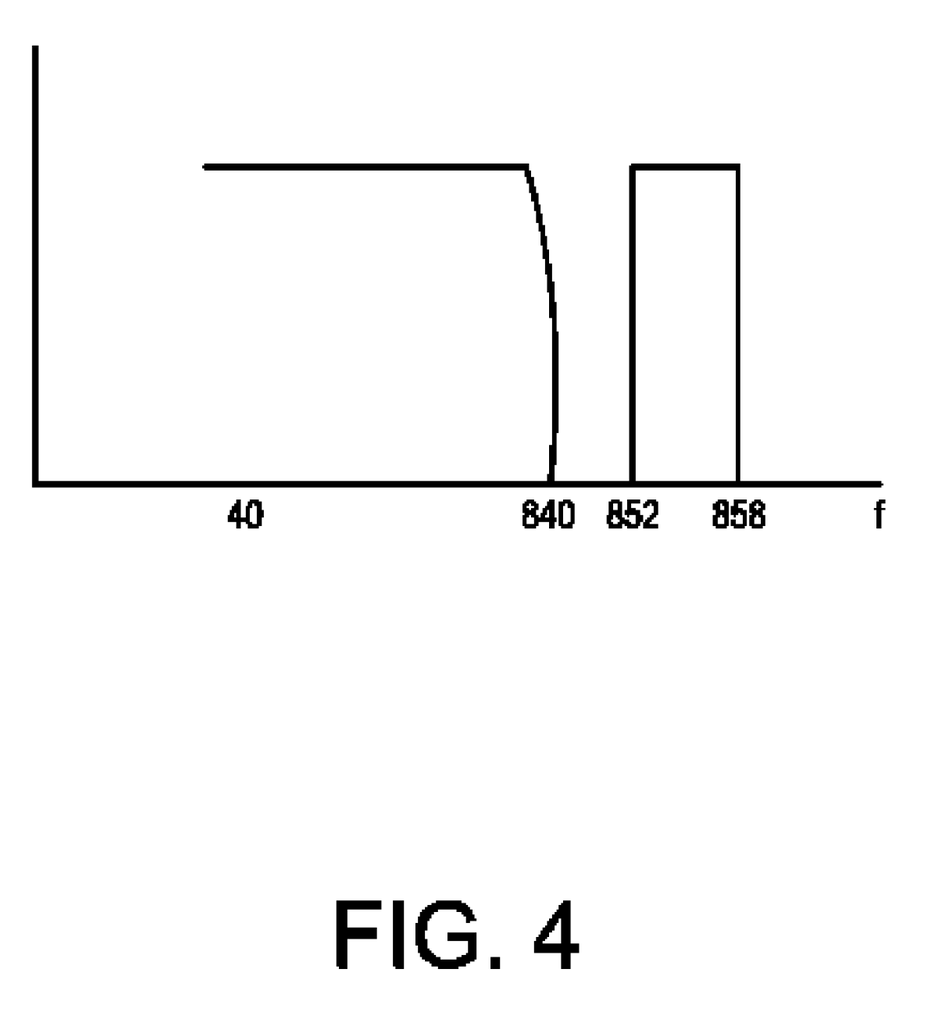
FIG. 4 illustrates an example of a graph of the frequencies of the downstream broadband signals and the predetermined frequencies of the up-converted selected signals.

In accordance with the present invention, the modulator 240 modulates the selected content signals (i.e., NMS presentations) provided from either the tuner system 335 or the storage device 330 prior to forwarding to the SIM 210. For example, a preferred embodiment of the present invention uses a QAM modulator, which may be used for effectively transmitting signals over coaxial cable in a cable television environment. Other embodiments may include a QPSK modulator in a satellite environment, an 8VSB (8-vestigial sideband) modulator in a digital terrestrial environment in the U.S., and a COFDM (coded orthogonal frequency division multiplexing) modulator in a digital terrestrial environment in Europe, or alternatively an analog modulator. The modulator 240 converts the signals to a predetermined intermediate frequency. Subsequently, the modulated presentations are up-converted to a predetermined higher frequency that is preferably greater than the highest frequency used in the system with, for example, a UHF converter 245. FIG. 4 illustrates an example of a graph of the conventional frequencies of the downstream broadband signals 403 and the predetermined frequencies of the up-converted NMS presentations 405. A preferred embodiment of the present invention is to up-convert the NMS presentations to an available high frequency channel, for example, channel 134, which may have a frequency range from 852 MHz to 858 MHz. The service provider, therefore, would provide downstream signals in the range from 45 MHz to approximately 840 MHz, thereby leaving frequencies greater than 840 MHz available for the transmission of NMS presentations. Accordingly, the NMS presentations 405 do not interfere with the downstream signals that may be concurrently provided via the common coax 220, 221-n to the primary STT 205 and the remote devices 215-n. It will be appreciated that other frequency ranges can be used that are either in-band (e.g., from 45 MHz to 860 MHz) or out-of-band (e.g., from 865 MHz to 1 GHz) so long as the predetermined frequency range is not used for transmission of the downstream signals or is within the range that is tunable by the plurality of remote devices 215-n. The up-converted NMS presentations are subsequently provided to the SIM 210 via a high pass filter in the diplex filter 235.

Furthermore, the remote device command receiver 285 is included in the primary STT 205 for receiving reverse NMS command signals from the plurality of remote devices 215-n. Command signals will be discussed further hereinbelow; however, the command signals can be transmitted in the form of on-off keying (OOK) signals, frequency shift keying (FSK) signals, or serial data transmissions, among others. The remote device command receiver 285, therefore, includes the respective demodulator, such as an OOK demodulator or an FSK demodulator that demodulates the signals as known to one skilled in the art.

Additionally, an optional DC source 280, which may supply, for example, 12 to 15 volts (V) and 200 milliamps (mA), may be provided to power an amplifier 275 located the SIM 210, if necessary. If required, the amplifier 275 amplifies the downstream signals received from the CN 130. It will be appreciated that if the SIM 210 is a passive splitter/isolation module, the DC source 280 is not necessary.

Preferred Embodiments of the SIM 210

Referring again to FIG. 2, the selected NMS presentations are provided by the primary STT 205 to the SIM 210 via the coaxial cable 220. In a first embodiment of the SIM 210, the selected NMS presentations are routed to the plurality of remote devices 215-n via a diplex filter 250. A splitter 266 provides the NMS presentations to HPF 255, which subsequently provides the filtered NMS presentations to splitter 267, diplex filter 260, and splitter 265. The high pass filter (HPF) 255 has low attenuation at the frequencies of the NMS presentation and high isolation at lower frequencies, and thus, provides high isolation between port 268 and ports 269-n at these lower frequencies. It will be appreciated that a bandpass filter (BPF) can alternatively be used depending on the transmission frequencies of the NMS presentations. Splitter 265 provides the NMS presentations to the plurality of remote devices 215-n. It will be appreciated that, at the frequencies of the NMS presentations, splitters 266 and 267 provide low insertion loss between port 268 and the splitter 265, thereby ensuring the NMS presentations are routed to the plurality of remote devices 215-n. Additionally, in an active SIM 210, the amplifier 275 further prevents the NMS presentations from reaching the CN 130.

Moreover, diplex filters 250 and 270 provide a path for upstream signals from the primary STT 205 to the headend. Similarly, diplex filters 260 and 270 provide a path for upstream signals from the plurality of remote devices 215-n to the headend. A high pass filter 271 allows any upstream signals (e.g., signals ranging from 5 MHz to 45 MHz) to pass through to the diplex filter 270 on to the CN 130. It will be appreciated that the reverse signals intended to remain in the NMS 200, such as reverse command signals from the remote devices 215-n, are reflected back and routed to the primary STT 205. Furthermore, the SIM 210 receives the downstream broadband signals from the headend 110 at diplex filter 270, which provides the downstream signals to the primary STT 205 or, alternatively, to both the primary STT 205 and the plurality of remote devices 215-n.

Notably, the preferred embodiments of the SIM 210 provide protection against any of the reverse command signals from leaving the NMS 200, thereby ensuring proper delivery to the primary STT 205 while also avoiding any interference with separate networked multimedia systems that may be in close proximity. A further advantage is that the SIM 210 enhances privacy and security by making the NMS 200 unobservable to any upstream devices in the CN 130.

A Preferred Embodiment of a Remote Point of Deployment (POD) Module 500

Figure 5:
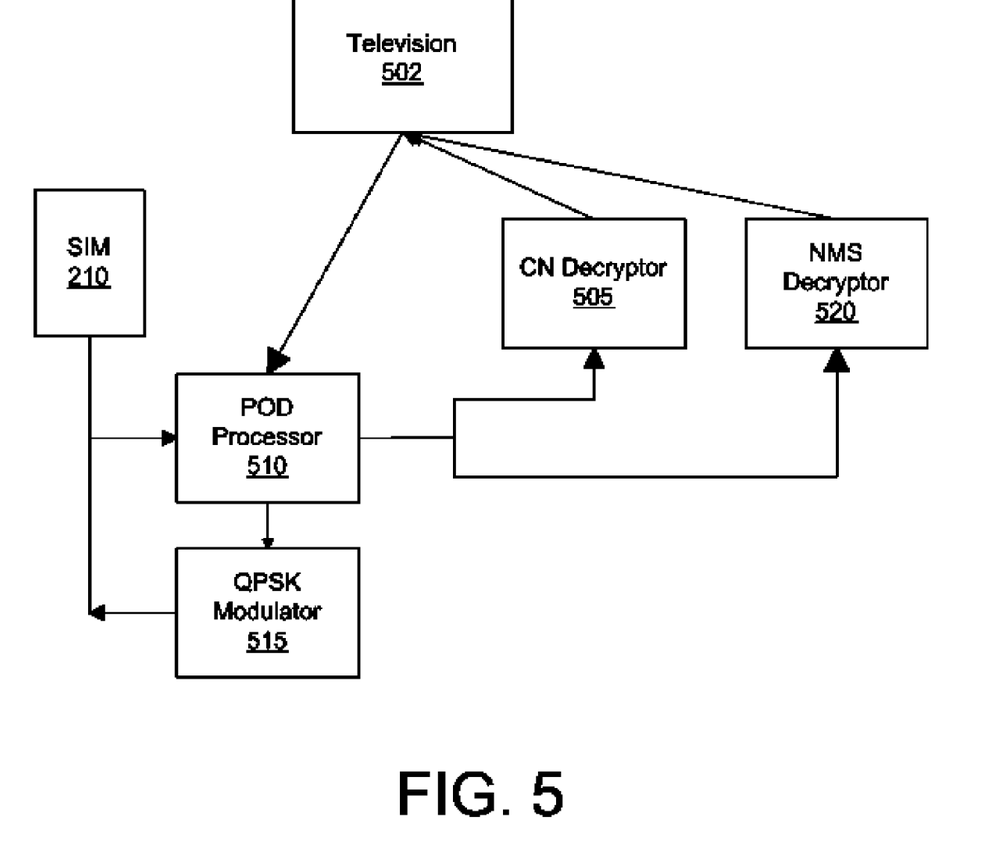
FIG. 5 is a simplified diagram of one preferred embodiment of a remote point of deployment module.

FIG. 5 is a simplified diagram of one preferred embodiment of a point of deployment (POD) module 500 (i.e., AMS CableCard). It will be appreciated that the POD module 500 must have two-way capabilities in order to communicate with the primary STT 205. The POD module 500 is inserted into a slot that is manufactured into a digital-ready television 502. The POD module 500 decrypts received encrypted signals by the CN decryptor 505 in order for proper viewing by the television 502. With two-way capabilities, the module 500 sends reverse signals to the headend in order to request a video-on-demand program, for example. Accordingly, the digital-ready television 502 in response to user input sends modulated signals to the POD module 500 for transmission to the headend.

In accordance with the present invention, the POD module 500 is also capable of sending reverse signals via the television 502 to the primary STT 205 requesting a stored presentation. By way of example, the user selects a guide showing the available stored presentations in the primary STT 205. After selection, the television 502 sends signals to the POD module processor 510. The processor 510 processes and transmits the reverse command signals that are indicative of user input commands using, for example, frequency shift keying (FSK). Preferably, a QPSK modulator 515 modulates the reverse command signals to an FSK signal at a frequency that is below the conventional upstream signals (i.e., below 5 MHz). In this manner, the reverse command signals do not interfere with conventionally transmitted upstream signals that may be provided from the POD module 500 or other remote devices 215-n. Optionally, the signals may be transmitted using an on-off keying (OOK) technique. Further information regarding sending the command signals can be found in copending U.S. patent application Ser. No. 10/342, 670, which was filed Jan. 15, 2003.

In response to the signals, the primary STT 205 retrieves a copy of the stored presentation and sends the presentation to the POD module 500 via the SIM 210. The POD processor 510 receives the signals, which are typically encrypted prior to storage by the primary STT 205 in a second decryption method, such as Triple-DES. Hence, an NMS decryptor 520 decrypts the presentation according to the second encryption method. The decrypted signals are then provided to the television 502 for viewing. The television 502 tunes to the modulator frequency and waits for the response (i.e., the stored presentation). Notably, in accordance with the present invention a remote device 500 that views a stored presentation is capable of utilizing advanced features via the primary STT 205, such as play, pause, fast-forward, or rewind functions, with the selected presentation. More specifically, the television 502 receives user input indicating one of the play, pause, fast-forward, or rewind signals and forwards the reverse command signals indicative of the user input signals to the primary STT 205. The processor 305 subsequently performs the function relating to the user input signals on the stored presentation that is being viewed, such as, for example, pausing transmission of the stored presentation until further commands are received.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A network system, comprising:
   a primary set-top terminal (STT) for receiving downstream signals encrypted with a first encryption scheme from a communications network and for selectively storing presentations included in the downstream signals with a second encryption scheme, the primary STT comprising:
   a tuner system for filtering tuned signals;
   a decryptor for decrypting the first encryption scheme associated with the filtered tuned signals;
   when the filtered tuned signals are selected to be stored, an encryptor for encrypting the selected tuned signals with the second encryption scheme; and
   a modulator for modulating the selected tuned signals having the second encryption scheme to a predetermined frequency and for providing modulated signals within the network system;
   a point of deployment (POD) module inserted into a cable-ready television, the cableready television coupled to the primary STT, the POD module for receiving the downstream signals in the first encryption scheme, and for requesting and receiving a tuned modulated signal in the second encryption scheme from the primary STT via the cable-ready television; and
   a splitter/isolation module (SIM) for receiving the downstream signals and for providing the downstream signals to both the primary STT and the POD module, and for receiving upstream signals from the primary STT and the POD module and providing the upstream signals to the communications network.

2. The network system of claim 1, wherein the primary STT further includes a storage device for storing the presentations having the second encryption scheme, and wherein the modulated signals includes a stored presentation.

3. The network system of claim 1, wherein the modulator is one of a QAM modulator, a QPSK modulator, a SVSB modulator, and a COFDM modulator.

4. The network system of claim 1, wherein the SIM receives the tuned modulated signal and provides the tuned modulated signal to the point of deployment module, and wherein the SIM receives at least one reverse command signal provided by the point of deployment module and provides the at least one reverse command signal to the primary STT.

5. The network system of claim 4, wherein the upstream signals are transmitted in a plurality of upstream frequencies, and wherein a reverse frequency of the at least one reverse command signal is excluded from the plurality of upstream frequencies.

6. The network system of claim 1, wherein the point of deployment module communicates with the primary STT by transmitting at least one reverse command signal via coaxial cable connected between the SIM and the cable-ready television.

7. The network system of claim 6, wherein the at least one reverse command signal is transmitted in an OOK format.

8. The network system of claim 6, wherein the at least one reverse command signal is transmitted in an FSK format.

9. The network system of claim 6, wherein the POD module receives a signal indicative of the at least one reverse command signal from the cable-ready television, wherein a user initiates the signal.

10. The network system of claim 1, wherein the downstream signals are transmitted in a plurality of downstream frequencies, and wherein the predetermined frequency of the tuned modulated signal is excluded from the plurality of downstream frequencies.

11. The network system of claim 1, wherein the tuned modulated signal is one of a stored presentation, a VOD presentation, an IPG application, an NMS application, and a television channel.

12. The network system of claim 1, further comprising at least one remote device coupled to the primary set-top terminal for receiving the downstream signals and for requesting and receiving the tuned modulated signal from the primary STT.

13. A network system for transmitting downstream presentations from a communications system and for transmitting upstream control signals received from devices with the network system, the network system comprising:
   a primary set-top terminal (STT) for receiving downstream presentations in a first encryption scheme and for storing selected presentations in a second encryption scheme, and for modulating a selected presentation having the second presentation scheme at a predetermined frequency and for providing the modulated presentation within the network system;
   a point of deployment (POD) module coupled to a television, the POD module comprising:
   a first decryptor for decrypting downstream presentations in the first encryption scheme; and
   a second decryptor for decrypting the modulated presentation in the second encryption scheme received from the primary STT, wherein a user initiates a reverse command signal, the reverse command signal processed by the television and provided to the POD module for transmitting to the primary STT; and
   a splitter/isolation module (SIM) for receiving the downstream presentations and for providing the downstream presentations to both the primary STT and the POD module, and for receiving upstream control signals from both the primary STT and the POD module and providing the upstream control signals to the service provider.

14. The network system of claim 13, wherein the POD module further comprises:
   a processor for processing the reverse command signal and for transmitting an FSK reverse command signal; and
   a modulator for modulating the FSK reverse command signal to a frequency that is unused by the downstream presentations and the upstream control signals.

15. The network system of claim 14, wherein the POD module receives a signal indicative of the at least one reverse command signal from the television, wherein a user initiates the signal.

16. The network system of claim 15, wherein the at least one reverse command signal is transmitted in an FSK format.

17. The network system of claim 13, wherein the SIM receives the second encrypted stored presentation from the primary STT, and wherein the SIM receives at least one reverse command signal provided by the POD module and transmits the at least one reverse command signal to the primary STT.

18. The network system of claim 13, wherein the POD module communicates with the primary STT by transmitting the at least one reverse command signal via coaxial cable connected between the SIM and the television.

* * * * *